*(12)* United States Patent
Liu

(10) Patent No.: US 8,332,155 B2
(45) Date of Patent: Dec. 11, 2012

(54) SYSTEM AND METHOD FOR HYDROCARBON GAS PAY ZONE CHARACTERIZATION IN A SUBTERRANEAN RESERVOIR

(75) Inventor: Chengbing Liu, Katy, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 208 days.

(21) Appl. No.: 12/880,453

(22) Filed: Sep. 13, 2010

(65) Prior Publication Data

US 2012/0065890 A1    Mar. 15, 2012

(51) Int. Cl.
*G01V 9/00* (2006.01)
*G01V 1/50* (2006.01)
*G01V 3/18* (2006.01)
*G01V 1/40* (2006.01)

(52) U.S. Cl. .................. 702/13; 702/6; 702/11; 367/25

(58) Field of Classification Search .................. 702/13, 702/6, 11, 33, 179, 5; 367/21, 25, 14, 26; 703/10; 175/40, 50; 166/250.01; 324/326, 324/323

See application file for complete search history.

(56) References Cited

U.S. PATENT DOCUMENTS

| | | | |
|---|---|---|---|
| 3,638,484 A | 2/1972 | Tixier | |
| 4,440,020 A | 4/1984 | Bolutemy et al. | |
| 4,475,038 A | 10/1984 | Lochmann et al. | |
| 6,140,816 A | 10/2000 | Herron | |
| 6,654,692 B1 | 11/2003 | Neff | |
| 6,950,748 B2 | 9/2005 | Liu et al. | |
| 6,957,146 B1 * | 10/2005 | Taner et al. | 702/14 |
| 7,113,869 B2 * | 9/2006 | Xue | 702/9 |
| 7,263,443 B2 | 8/2007 | Clavaud | |
| 7,365,307 B2 * | 4/2008 | Stoller et al. | 250/269.2 |
| 8,121,969 B2 * | 2/2012 | Chan et al. | 706/47 |
| 2003/0050758 A1 | 3/2003 | Soliman et al. | |
| 2003/0222651 A1 | 12/2003 | Tabanou | |
| 2004/0000430 A1 | 1/2004 | King | |
| 2007/0203681 A1 | 8/2007 | Eyvazzadeh et al. | |
| 2009/0319243 A1 * | 12/2009 | Suarez-Rivera et al. | 703/10 |
| 2012/0065887 A1 * | 3/2012 | Liu | 702/7 |

OTHER PUBLICATIONS

Lewis, Evaluation of Shale Gas Reservoirs, Apr. 2007.
Lewis et al., New Evaluation Techniques for Gas Shale Reservoirs, 2008.
Revels, Louisiana Haynesville Shale Play: Geology and Regulatory, Louis Gilbert & Associates Inc., Feb. 2009.

(Continued)

*Primary Examiner* — Michael Nghiem
*Assistant Examiner* — Ricky Ngon
(74) *Attorney, Agent, or Firm* — Marie L. Clapp

(57) ABSTRACT

A system and computer-implemented method for characterizing hydrocarbon gas net pay zones in a subterranean reservoir including determining a sweet zone indicator from well log data, determining rock properties from well log data, and identifying one or more classes of net pay zones from the sweet zone indicator and rock properties. The sweet zone indicator may be determined by computing neutron-density separation and using the neutron-density separation and the well log data. The rock properties determined from the well log data may include total water saturation, adsorbed gas saturation, total gas content, porosity, propensity for hydraulic fracturing, uncertainty level of the total water saturation, uncertainty level of the total gas content, and baselines for the porosity and total gas content. Using the sweet zone indicator and rock properties, one or more classes of net pay zones can be identified.

10 Claims, 3 Drawing Sheets

OTHER PUBLICATIONS

Petris Tecnology Inc., PetrisWINDS Recall PETROS 3 Log Evaluation, Petris Technology Inc. 2010.

Aly et al., Resistivity, Radioactivity and Porosity Logs As Tools to Evaluate the Organic Content of Abu Roash "F" and "G" Members, North Western Desert,Egypt, Egyptian Geophysical Society, 2003.

Doveton et al., Borehole petrophysical chemostratigraphy of Pennsylvanian black shales in the Kansas subsurface, Kansas Geological Survey, University of Kansas 2004.

Ross et al., Characterizing the shale gas resource potential of Devonian-Mississippian strata in the Western Canada sedimentary basin: Application of an integrated formation evaluation, Jan. 2008.

Vaughn et al., Litho-flow facies prediction in an alluvial fan/fluvial system, Central North Sea, 1999.

PCT International Search Report dated Feb. 9, 2012.

* cited by examiner

SYSTEM AND METHOD FOR HYDROCARBON GAS PAY ZONE CHARACTERIZATION IN A SUBTERRANEAN RESERVOIR

CROSS-REFERENCE TO RELATED APPLICATIONS

This application is related to U.S. patent application Ser. No. 12/880,436 entitled System and Method for Sweet Zone Identification in Shale Gas Reservoirs, which is incorporated in its entirety herein by reference.

FIELD OF THE INVENTION

The present invention relates generally to methods and systems for characterizing hydrocarbon gas pay zones in a subterranean reservoir, and in particular methods and systems for identifying and classifying net pay zones in shale gas reservoirs.

BACKGROUND OF THE INVENTION

"Net pay zones" can be used to characterize porous, permeable hydrocarbon gas reservoirs of commercial interest. Quick and accurate identification of net pay zones in wells, classification of the net pay zones, mapping of the net pay zones, and placement of horizontal wellbores within the best net pay zones are some of the most important tasks in gas exploration and development. This is especially the case with respect to shale gas fields, where methods of identifying and classifying organic-rich zones have gained in importance.

In many cases, the existing methods are applicable only to the specific formation in which they have been applied, and do not have general relevance to new areas of exploration and development.

SUMMARY OF THE INVENTION

According to one implementation of the present invention, a computer-implemented method of characterizing hydrocarbon gas pay zones in a subterranean reservoir includes determining a sweet zone indicator based on well log data related to the reservoir, determining rock properties based on the well log data, deriving one or more classes of net pay zones from the sweet zone indicator and the rock properties, and outputting the net pay zones to identify areas of interest within the subterranean reservoir. The sweet zone indicator can be determined by calculating a normalized neutron-density separation and using the computed normalized neutron-density separation and well log data. The rock properties determined from the well log data may include total water saturation, adsorbed gas saturation, total gas content, porosity, propensity for hydraulic fracturing, uncertainty level of the total water saturation, uncertainty level of the total gas content, and baselines for the porosity and total gas content. The one or more classes of net pay zones may include first-class, second-class and third-class net pay zones that are characterized based on the sweet zone indicator and the rock properties.

In an embodiment, a system for characterizing hydrocarbon gas net pay zones in a subterranean reservoir includes a device for providing data representative of physical characteristics of the subterranean reservoir, a computer processor in communication with the device and configured to receive the data and to execute a computer executable code responsive to the data, the computer executable code including a sweet zone indicator module for identifying potential organic-rich zones from the data, a rock properties module for calculating rock properties from the data, and a net pay zone identification module for identifying one or more classes of net pay zones from the sweet zone indicator and the rock properties. The system also includes a user interface and a display.

The above summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

These and other features of the present invention will become better understood with regard to the following description, pending claims and accompanying drawings where:

DETAILED DESCRIPTION OF THE INVENTION

Figure 1:
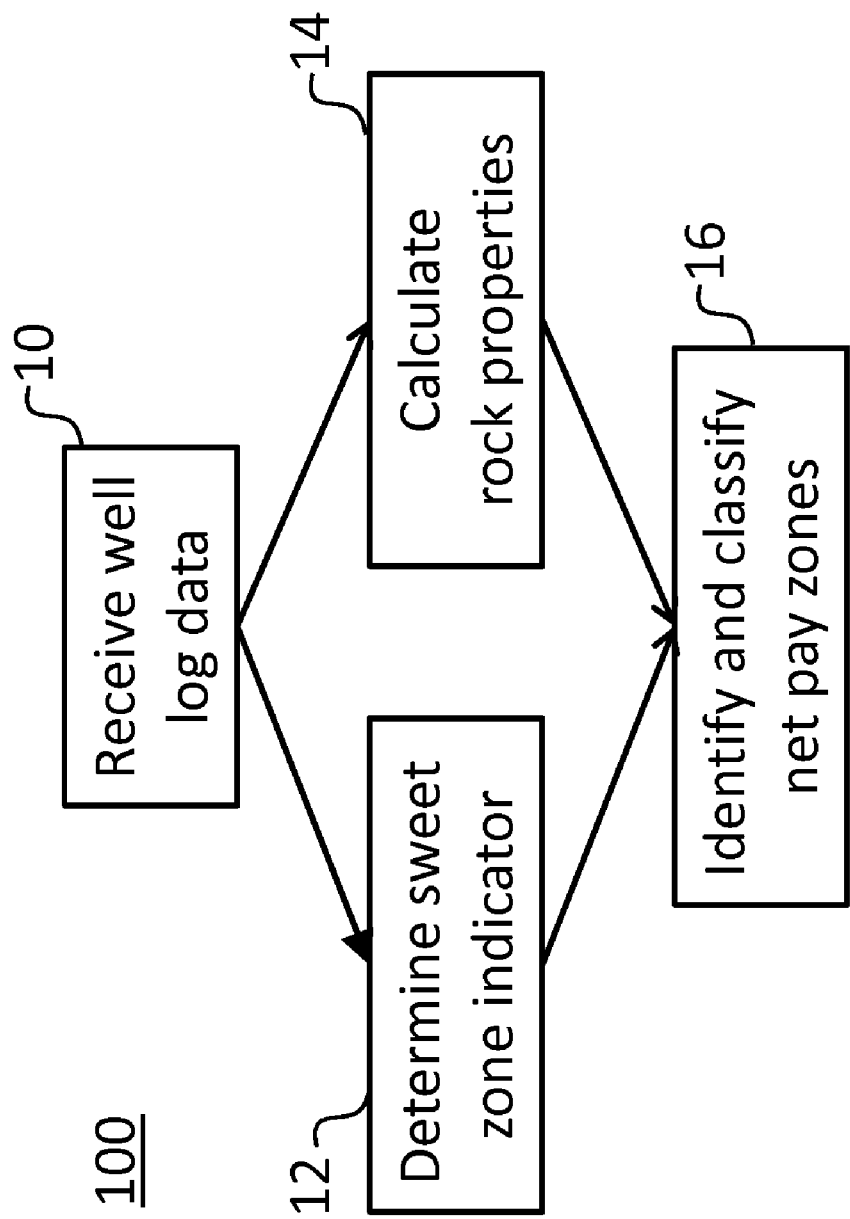
FIG. 1 is a flowchart illustrating a method in accordance with an embodiment of the invention.

The present invention may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present invention may be coded in different languages for application in a variety of computing platforms and environments. It will be appreciated that the scope and underlying principles of the present invention are not limited to any particular computer software technology.

Moreover, those skilled in the art will appreciate that the present invention may be practiced using any one or combination of hardware and software configurations, including but not limited to a system having single and/or multiple computer processors, hand-held devices, programmable consumer electronics, mini-computers, mainframe computers, and the like. The invention may also be practiced in distributed computing environments where tasks are performed by servers or other processing devices that are linked through a one or more data communications network. In a distributed computing environment, program modules may be located in both local and remote computer storage media including memory storage devices.

Also, an article of manufacture for use with a computer processor, such as a CD, pre-recorded disk or other equivalent devices, may include a computer program storage medium and program means recorded thereon for directing the computer processor to facilitate the implementation and practice of the present invention. Such devices and articles of manufacture also fall within the spirit and scope of the present invention.

Referring now to the drawings, embodiments of the present invention will be described. The invention can be implemented in numerous ways, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

The present invention relates to characterizing hydrocarbon gas net pay zones and, by way of example and not limitation, can be used to evaluate shale formations to determine whether they are likely to contain significant amounts of organic matter, therefore acting as a good source of hydrocarbon resources, and rock properties that would allow the hydrocarbon resources to be recovered through wellbores. In shale gas reservoirs, two elements of the rock properties that may be considered are the gas capacity of the rock and the rock mechanics. One method of characterizing a formation is to make measurements of characteristics along a wellbore penetrating the formation, either during or after drilling operations, i.e., well logging. Well logging includes a number of techniques including sonic measurements, density measurements, resistivity/conductivity measurements, ultrasound, NMR, neutron, uranium concentration and radiation scattering, for example. Wellbore data of this type is often used to replace or supplement the collection of cores for direct inspection. Conventionally, logged wellbore data is analyzed by human interpreters in order to characterize a subsurface geological formation to allow decisions to be made regarding potential of the well or to determine information about the nature of the surrounding geologic area. Wellbore data may be collected either during or after drilling of the borehole.

The inventor has determined that by combining information from a variety of well logs, a quantitative approach may be pursued to identify formations or portions of formations that are likely to be rich in organic material and therefore likely to offer potential in hydrocarbon production, without requiring human interpretation. Further, the inventor has determined that it is possible to classify the organic-rich formations or portions of formations to be a first-class net pay zone, from which hydrocarbon gas can be recovered using current technology, or a second-class net pay zone, from which hydrocarbon gas may be recovered using future technology, depending on additional information from the well logs. Additional pay zones within the formation can be identified and classified dependent on their proximity to the organic-rich zones. These classes of net pay zones can be further characterized by types dependent on specific rock properties.

In this regard, an example of a method 100 in accordance with the present invention is illustrated in the flowchart of FIG. 1. At step 10, well log data is received. In an embodiment, the well log data comprises neutron, density, uranium concentration, resistivity, and sonic data. In another embodiment, uranium concentration is replaced by gamma ray data. As will be appreciated, the well log data may be acquired by any of a variety of well logging techniques, or may be existing well log data stored locally or remotely from a computer system on which the method is executed. As can be appreciated, there are many additional types of well log data that may be useful for characterizing hydrocarbon gas net pay zones and the above examples are not meant to limit the data that may be used or to require that the listed well log data types be used.

From the well log data, a sweet zone indicator is determined in step 12 and rock properties are calculated in step 14. These steps may be performed in any order or concurrently, and may be performed at each depth level in the well, for depth zones within particular formations of interest, or for depth zones within portions of formations of interest. An embodiment of the rock properties that are calculated in step 14 includes a total water saturation, an uncertainty level of the total water saturation, a adsorbed gas saturation, a total gas content, a baseline of the total gas content in rocks of the formation, an uncertainty level of the total gas content, a porosity, and a propensity for hydraulic fracture of the rock surrounding the borehole. If the formation surrounding the borehole contains carbonate rocks, the rock properties calculated in step 14 may also include a porosity baseline of the carbonate rocks. As one skilled in the art can appreciate, these rock properties can be computed from the following well logs or a combination thereof: neutron, density, uranium (or gamma ray if uranium log is not available), resistivity, elemental capture spectroscopy, etc.

The baselines calculated in step 14 may be constants, curves or trendlines depending on the geological or borehole conditions. In one embodiment, the baselines may be calculated from portions of the well logs. In another embodiment, the baselines may be calculated from well logs from a different wellbore. In a third embodiment, the baselines may be selected from known geological data from analogous formations. These embodiments are not intended to limit the methods for calculating the baselines.

The propensity for hydraulic fracture that is calculated in step 14 is a measure of how easily the rocks can be fractured using hydraulic fracturing technology in the wellbore. This propensity for hydraulic fracture may be large, meaning the formation surrounding the borehole may be easily fractured, or small, meaning the formation surrounding the borehole is difficult to fracture. The determination of the propensity for hydraulic fracture depends on current hydraulic fracturing technology, current hydraulic fracturing policies, and the following equation:

$$EZP_{frac} = ((2*PR)/(1-PR))*\int(0.433*\rho_b)dz + ((1-(2*PR)/(1-PR)))*\int(0.433*\rho_{pf})dz \qquad \text{Eqn. 1}$$

With respect to Equation 1, $EZP_{frac}$ is a numerical value used in conjunction with knowledge of current hydraulic fracturing technology and policies to determine if the propensity for hydraulic fracturing is large or small, PR is Poisson's ratio, $\rho_b$ is the formation bulk density in units of g/cc, $\rho_{pf}$ is the equivalent pore fluid density or mud density in units of g/cc, and z is the true vertical depth in feet. The calculation of $EZP_{frac}$ is normally done over a depth interval in the wellbore that has been previously determined to be of interest for shale gas production.

Using the sweet zone indicator and the rock properties, multiple classes of net pay zones are identified at step 16. The sweet zone indicator and calculated rock properties are used to determine whether portions of the formations surrounding the borehole have a source of hydrocarbon gas, the gas capacity of the rock, and the propensity for hydraulic fracture. In one embodiment, to determine if a portion or a whole of a formation may be a potential net pay zone (PNP), it may be evaluated by the following logic:

if (RNR>0 and GC_TG>(GC_TG_NSBSL+GC_T-G_UNCL) and PHIT>PHIT_TCSBSL) then PNP=1 else PNP=0 where RNR is the sweet zone indicator, GC_TG is the total gas content, GC_TG_UNCL is the uncertainty level of the total gas content, GC_TG_NSBSL is the total gas content baseline of the rocks in the formation, PHIT is the porosity and PHIT_TCSBSL is the porosity baseline of carbonate rocks if they exist in the formation or else may be set to zero.

In one embodiment, when a portion or a whole of a formation has been identified as a potential net pay zone (PNP=1), that zone may then be divided into first-class and second-class net pay zones. In shale gas reservoirs, a first-class pay zone (PNP_C1) may be defined as a potential pay zone that may contain hydrocarbon gas that is recoverable using current technology. A second-class pay zone (PNP_C2) may be defined as a potential pay zone that may contain hydrocarbon gas that may be recoverable using future technology. In one embodiment, these pay zone classifications can be defined by the following logic:

if (PNP=1 and $(1-S_{wt})>S_{wt\_}$UNCL and $EZP_{frac}$=large) then PNP_C1=1 else PNP_C1=0
if (PNP=1 and PNP_C1=0) then PNP_C2=1 where $S_{wt}$ is the total water saturation and $S_{wt\_}$UNCL is the uncertainty level of the total water saturation. The term $(1-S_{wt})$ is also defined as the adsorbed gas saturation.

As can be appreciated, the above logic means that when a portion or whole of a shale formation is identified as being a sweet zone, that portion or whole can be further classified as either a first-class net pay zone which has a large adsorbed gas saturation and a large propensity to hydraulic fracture, meaning it would be easy to produce the gas using current technology, or a second-class net pay zone which may be an economic reservoir in the future with enhanced technology.

By way of example and not limitation, a second-class net pay zone may be further classified by type depending on its particular rock properties. In one embodiment, the second-class net pay zone could be type A (PNP_C2A) if its adsorbed gas saturation is greater than the uncertainty level of the total water saturation or it could be type B (PNP_C2B) if its propensity for hydraulic fracture is large as shown by the following logic:

if (PNP_C2=1 and $(1-S_{wt})>S_{wt\_}$UNCL) then PNP_C2A=1 else PNP_C2A=0
if (PNP_C2=1 and $EZP_{frac}$=large) then PNP_C2B=1 else PNP_C2B=0.

These types might be useful in determining the necessary technology to produce gas from this second-class pay zone.

The above embodiment uses only two classes for potential net pay zones within a portion or whole of a formation that may contain hydrocarbon gas. As can be appreciated, dependent on the available technology for producing hydrocarbon gas, these classifications may change and additional classes may be added. The above embodiment is not intended to limit the identification and classification of the net pay zones.

In addition to the classes of net pay zones in a portion or whole of a formation that is identified as being a sweet zone, it may also be useful to classify potential net pay zones outside of the sweet zones. One skilled in the art will be aware that hydrocarbon gas generated in sweet zones may migrate a short distance into nearby formations. Therefore, it is possible to classify another net pay zone that does not have a positive sweet zone indicator but is physically close to the portion or whole of the formation that has a positive sweet zone indicator. In this case, if the portion or whole of the formation has an adsorbed gas saturation greater than the uncertainty level of the total water saturation and is within some small distance, which in one embodiment may be 50 feet, that portion or whole of the formation may be classified as another net pay zone. In the embodiment where the sweet zone indicator net pay zones are identified as first-class and second-class net pay zones, this net pay zone may be classified as a third-class pay zone.

Figure 2:
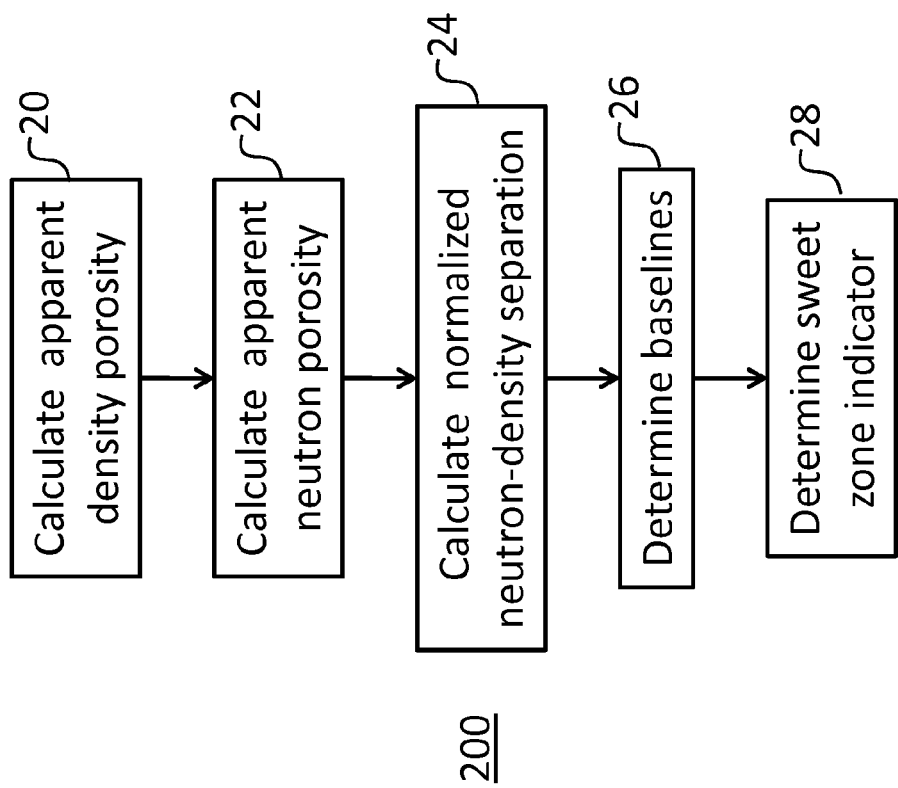
FIG. 2 is a flowchart illustrating a step of determining a sweet zone indicator in accordance with an embodiment of the invention.

An embodiment of a method 200 of determining the sweet zone indicator (RNR) from step 12 of FIG. 1 is illustrated in the flowchart of FIG. 2. In a particular example and not by way of limitation, this may be done for a shale formation. From the neutron and density well log data, an apparent density porosity (PHIT_D) is calculated in step 20. In this regard, Equation 2 sets out the calculation for PHIT_D:

$$PHIT\_D=\min(\max(((\rho_M-\rho_B)/(\rho_M-\rho_F)),0.0),1.0) \qquad \text{Eqn. 2}$$

With respect to Equation 2, $\rho_M$ is the density of the rock matrix (where the matrix is selected to be a calcite matrix or other appropriate matrix, depending on the geology of the shale formation), $\rho_B$ is the bulk density of the rock, and $\rho_F$ is the density of fluid in the rock where the fluid may be water. As will be appreciated, this Equation will produce a value of 0.0 where the ratio $(\rho_M-\rho_B)/(\rho_M-\rho_F)$ is negative, 1.0 when the ratio is greater than one, and the value of the ratio where the ratio is between zero and one. That is, it calculates a porosity value that is bounded by zero and one. Next, at step 22, an apparent neutron porosity (PHIT_N) is calculated in accordance with Equation 3:

$$PHIT\_N=\min(\max(((TNPH-TNPM)/(TNPF-TNPM)),0.0),1.0) \qquad \text{Eqn. 3}$$

In Equation 3, TMPH is the neutron porosity reading of the rock, TNPM is the neutron porosity of the matrix and TNPF is the neutron porosity of the fluid. Similarly to Equation 4, this Equation produces a value equal to the ratio (TNPH−TNPM)/(TNPF−TNPM) for values between zero and one, and is bounded by zero and one for all other values of the ratio.

Using the results of Equations 2 and 3, a value for normalized neutron-density separation (VWSH_NDS) may be calculated (step 24) in accordance with Equation 4:

$$VWSH\_NDS=\max(\min([(PHIT\_N-PHIT\_D)-(PHIT\_N-PHIT\_D)_{min}]/[(PHIT\_N-PHIT\_D)_{ns}-(PHIT\_N-PHIT\_D)_{min}],1.0),-1.0) \qquad \text{Eqn. 4}$$

In Equation 4, the newly introduced quantity $(PHIT\_N-PHIT\_D)_{ns}$ is the neutron-density separation for normal shales and the $(PHIT\_N-PHIT\_D)_{min}$ is the minimum of $(PHIT\_N-PHIT\_D)$ and is generally equal to or very near zero. In an embodiment, $(PHIT\_N-PHIT\_D)_{min}$ is taken to be zero and that portion of the numerator and denominator is eliminated. This equation produces values between minus one and one, although in most cases the values are between zero and one.

At step 26, a baseline value for each of the quantities is determined. For an embodiment using neutron, density, uranium concentration and resistivity data, baselines are determined for each of these. For embodiments in which gamma ray data replaces uranium concentration data, a baseline for gamma ray log readings is determined.

At step 28, the values determined in the preceding steps are used to generate a sweet zone indicator (RNR) in accordance with the following logic:

if (VWSH_NDS<VWSH_NDS_NSBSL·FVBSL and URAN>URAN_NSBSL·FUBSL and RD>RD_NSBSL·FRBSL) then RNR=1 else RNR=0

In the above logic for step 28, VWSH_NDS_NSBSL is the normalized neutron-density separation baseline for normal shales, URAN is a uranium concentration, URAN_NSBSL is baseline uranium concentration for normal shales, RD is a resistivity, RD_NSBSL is a baseline resistivity for normal shales and, FVBSL, FUBSL and FRBSL are adjustment factors for the respective baselines. Thus, if the normalized neutron-density separation is less than an adjusted baseline, and uranium and resistivity are above their respective adjusted baselines, then the indicator takes the value one, otherwise it takes the value zero.

As will be appreciated, the baseline for each type of log may be a constant, or may be a curve or trendline, depending on the geological or wellbore conditions. The respective adjustment factors, FVBSL, FUBSL and FRBSL are selected to reduce measurement noise and also to reduce high frequency variations in the actual geological structure, thereby improving reliability of the indicator.

In alternate step 28, for the case where uranium logs are replaced with gamma ray logs, the following logic may be used:

if (VWSH_NDS<VWSH_NDS_NSBSL·FVBSL and GR>GR_NSBSL·FGBSL and RD>RD_NSBSL·FRBSL) then RNR=1 else RNR=0

The newly introduced quantities in the alternate logic of step 28 are GR, which indicates gamma ray data, GR_NSBSL which is the gamma ray baseline for normal shale and FGBSL, the adjustment factor for the gamma ray baseline.

In general, the adjustment factors are selected to be close to one, and in an embodiment can be limited to a range between 0.5 and 1.5. In a particular embodiment, (VSBSL, FUBSL, FRBSL, FGBSL)=(0.6, 0.99, 0.99, 0.99).

As will be appreciated, steps 20 and 22 can be performed in any order. Likewise, the baseline determination for each type of well log performed in step 26 could, in principle, be performed in advance of any of the other calculations, and after all calculations except those of step 28, which depend on the results of step 26.

Evaluation of either of the two previous logic statements will return a value of one or zero, indicating presence or absence of a sweet zone respectively. The indicator may then be used as a basis for determining a depth to initiate a horizontal drilling operation, or otherwise to guide production drilling decisions.

Figure 3:
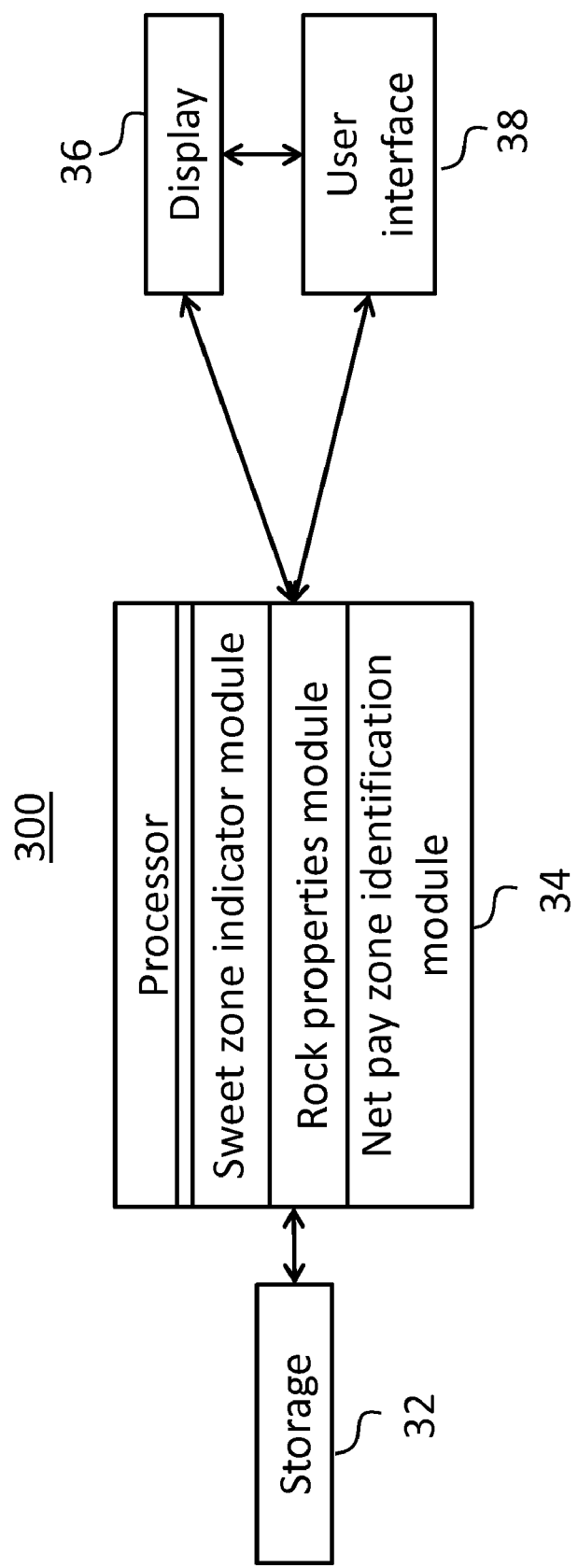
FIG. 3 schematically illustrates a system for performing a method in accordance with an embodiment of the invention.

A system 300 for performing the method is schematically illustrated in FIG. 3. The system includes a data storage device or memory 32. The stored data may be made available to a processor 34, such as a programmable general purpose computer. The processor 34 is configured to execute the sweet zone indicator module for identifying potential organic-rich zones, the rock properties module for calculating rock properties, and the net pay zone identification module for identifying one or more classes of net pay zones. The processor 34 may include interface components such as a display 36 and a user interface 38, and is used to implement the above-described transforms in accordance with embodiments of the invention. The user interface may be used both to display data and processed data products and to allow the user to select among options for implementing aspects of the method. The identified and classified net pay zones computed on the processor 34 may be displayed on the display 36, stored on the data storage device or memory 32, or both displayed and stored.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention. In addition, it should be appreciated that structural features or method steps shown or described in any one embodiment herein can be used in other embodiments as well.

What is claimed is:

1. A computer-implemented method of characterizing hydrocarbon gas net pay zones in a subterranean reservoir, comprising:
   determining, via a computer processor, a sweet zone indicator based on well log data related to the reservoir;
   determining, via the computer processor, rock properties based on the well log data, wherein the rock properties comprise a total water saturation, an adsorbed gas saturation, a total gas content, a porosity, a propensity for hydraulic fracturing, an uncertainty level of the total water saturation, an uncertainty level of the total gas content, a porosity baseline for carbonate rocks present in the subterranean reservoir, and a total gas content baseline for rocks present in the subterranean reservoir;
   deriving, via the computer processor, one or more classes of net pay zones from the sweet zone indicator and the rock properties, wherein the one or more classes of net pay zones comprise one or more first-class net pay zones and wherein the first-class net pay zones have the sweet zone indicator greater than zero, the total gas content greater than a sum of the total gas content baseline for the rocks and the uncertainty level of the total gas content, the porosity greater than the porosity baseline for the carbonate rocks, the adsorbed gas saturation greater than the uncertainty level of the total water saturation and a large propensity for hydraulic fracture; and outputting, from the computer processor, the one or more net pay zones to identify areas of interest within the subterranean reservoir.

2. The method of claim 1, wherein determining the sweet zone indicator comprises:
   calculating a normalized neutron-density separation; and
   using the normalized neutron-density separation and the well log data to determine the sweet zone indicator.

3. The method of claim 1, wherein calculating the propensity for hydraulic fracturing uses a Poisson's ratio, a formation bulk density, an equivalent pore fluid density, and a true vertical depth.

4. The method of claim 1, wherein the one or more classes of net pay zones further comprises one or more second-class net pay zones.

5. The method of claim 4, wherein the second-class net pay zones have the sweet zone indicator greater than zero, the total gas content greater than a sum of the total gas content baseline for the rocks and the uncertainty level of the total gas content, and the porosity greater than the porosity baseline for the carbonate rocks.

6. The method of claim 4, wherein the one or more classes of net pay zones further comprises one or more third-class net pay zones.

7. The method of claim 6, wherein the one or more third-class net pay zones have the adsorbed gas saturation greater that the uncertainty level of the total water saturation and a small physical distance to a sweet zone indicator greater than zero.

8. The method of claim 1, wherein the one or more classes of net pay zones are further characterized by one or more types derived from the rock properties.

9. A system for characterizing hydrocarbon gas net pay zones in a subterranean reservoir, comprising:
   a device for providing data representative of physical characteristics of the subterranean reservoir;
   a computer processor in communication with the device and configured to receive the data and to execute a computer executable code responsive to the data, the computer executable code comprising:

a sweet zone indicator module for identifying potential organic-rich zones from the data;

a rock properties module for calculating rock properties from the data, wherein the rock properties comprise a total water saturation, an adsorbed gas saturation, a total gas content, a porosity, a propensity for hydraulic fracturing, an uncertainty level of the total water saturation, an uncertainty level of the total gas content, a porosity baseline for carbonate rocks present in the subterranean reservoir, and a total gas content baseline for rocks present in the subterranean reservoir; and a net pay zone identification module for identifying one or more classes of net pay zones from the sweet zone indicator and the rock properties, wherein the one or more classes of net pay zones comprise one or more first-class net pay zones and wherein the first-class net pay zones have the sweet zone indicator greater than zero, the total gas content greater than a sum of the total gas content baseline for the rocks and the uncertainty level of the total gas content, the porosity greater than the porosity baseline for the carbonate rocks, the adsorbed gas saturation greater than the uncertainty level of the total water saturation and a large propensity for hydraulic fracture; and a user interface.

10. An article of manufacture comprising a non-transitory computer readable medium containing computer instructions stored therein for causing a computer processor to perform steps of a method of characterizing hydrocarbon gas net pay zones in a subterranean reservoir, the method comprising:

determining a sweet zone indicator based on well log data related to the reservoir;

determining rock properties based on the well log data, wherein the rock properties comprise a total water saturation, an adsorbed gas saturation, a total gas content, a porosity, a propensity for hydraulic fracturing, an uncertainty level of the total water saturation, an uncertainty level of the total gas content, a porosity baseline for carbonate rocks present in the subterranean reservoir, and a total gas content baseline for rocks present in the subterranean reservoir;

deriving one or more classes of net pay zones from the sweet zone indicator and the rock properties, wherein the one or more classes of net pay zones comprise one or more first-class net pay zones and wherein the first-class net pay zones have the sweet zone indicator greater than zero, the total gas content greater than a sum of the total gas content baseline for the rocks and the uncertainty level of the total gas content, the porosity greater than the porosity baseline for the carbonate rocks, the adsorbed gas saturation greater than the uncertainty level of the total water saturation and a large propensity for hydraulic fracture; and outputting the one or more classes net pay zones to identify areas of interest within the subterranean reservoir.

* * * * *